United States Patent
Boenning

(10) Patent No.: US 10,077,101 B2
(45) Date of Patent: Sep. 18, 2018

(54) AIRCRAFT WINDOW ARRANGEMENT

(71) Applicant: Airbus Operations GmbH, Hamburg (DE)

(72) Inventor: Kenneth Boenning, Hamburg (DE)

(73) Assignee: Airbus Operatins GmbH, Hamburg (DE)

(*) Notice: Subject to any disclaimer, the term of this patent is extended or adjusted under 35 U.S.C. 154(b) by 116 days.

(21) Appl. No.: 14/076,239

(22) Filed: Nov. 10, 2013

(65) Prior Publication Data
US 2014/0131516 A1 May 15, 2014

Related U.S. Application Data

(60) Provisional application No. 61/725,499, filed on Nov. 13, 2012.

(30) Foreign Application Priority Data

Nov. 13, 2012 (EP) .................................. 12192367.6

(51) Int. Cl.
B64C 1/14 (2006.01)
B64C 1/06 (2006.01)

(52) U.S. Cl.
CPC ............ B64C 1/1484 (2013.01); B64C 1/066 (2013.01); B64C 1/1492 (2013.01); Y02T 50/46 (2013.01); Y10T 29/49826 (2015.01)

(58) Field of Classification Search
CPC ..... B64C 1/1492; B64C 1/1484; B64C 1/066; Y02T 50/46; Y10T 29/49826
USPC .................................................... 244/129.3
See application file for complete search history.

(56) References Cited

U.S. PATENT DOCUMENTS 2,575,757 A * 11/1951 Hardy .................. B64C 1/1492
244/129.3
2,602,970 A * 7/1952 Gouge .................. B64C 1/1492
244/129.3
4,364,533 A * 12/1982 Pompei ................. B64C 1/1492
244/129.3

(Continued)

FOREIGN PATENT DOCUMENTS

DE 102009031523 1/2011

OTHER PUBLICATIONS

European Search Report, dated Apr. 16, 2013.

Primary Examiner — Medhat Badawi
(74) Attorney, Agent, or Firm — Greer, Burns & Crain Ltd.

(57) ABSTRACT

An aircraft window arrangement comprising a sidewall lining panel which is provided with a window opening, an inner window attached to the sidewall lining panel and extending across the window opening formed in the sidewall lining panel and an outer window arranged at a distance from the inner window and extending across a window opening formed in an aircraft outer skin. The aircraft window arrangement further comprises a window funnel including an inner rim facing the inner window and extending along a circumference of the window opening formed in the sidewall lining panel, and an outer rim facing the outer window and extending along a circumference of the window opening formed in the aircraft outer skin. The window funnel is formed separate from the sidewall lining panel. The window funnel may be attached to a retainer for retaining the outer window.

8 Claims, 2 Drawing Sheets

(56) References Cited

U.S. PATENT DOCUMENTS

| | | | | |
|---|---|---|---|---|
| 4,450,661 A * | 5/1984 | Whitener | B64C 1/1484 | 244/120 |
| 4,541,595 A * | 9/1985 | Fiala | B64C 1/1492 | 244/129.3 |
| 5,988,566 A * | 11/1999 | Meyer | B64C 1/1492 | 244/129.3 |
| 6,082,674 A * | 7/2000 | White | B64C 1/1492 | 244/129.3 |
| 6,168,112 B1 * | 1/2001 | Mueller | B64C 1/1492 | 244/129.3 |
| 7,118,070 B2 * | 10/2006 | Abrams | B60J 1/006 | 244/129.3 |
| 7,210,655 B2 * | 5/2007 | Novak | B64C 1/066 | 244/119 |
| 7,281,686 B2 * | 10/2007 | Wood | B64C 1/1492 | 244/119 |
| 7,552,896 B2 * | 6/2009 | Coak | B64C 1/1492 | 244/119 |
| 7,661,626 B2 * | 2/2010 | Wood | B64C 1/1492 | 244/129.3 |
| 7,807,003 B2 * | 10/2010 | Schuler | E06B 3/6775 | 156/109 |
| 7,823,833 B2 * | 11/2010 | Wood | B60J 1/006 | 244/129.3 |
| 7,968,170 B2 * | 6/2011 | Albers | B29C 43/18 | 428/138 |
| 8,079,185 B2 * | 12/2011 | Paspirgilis | 52/204.62 | |
| 8,087,615 B2 * | 1/2012 | Wood | 244/129.3 | |
| 8,114,232 B2 * | 2/2012 | Lisec | E06B 3/6733 | 156/104 |
| 8,123,168 B2 * | 2/2012 | Switzer et al. | 244/129.3 | |
| 8,511,610 B2 * | 8/2013 | Depeige | B64C 1/14 | 244/129.4 |
| 8,567,720 B2 * | 10/2013 | Gallant | B64C 1/061 | 244/119 |
| 8,800,926 B2 * | 8/2014 | Kirchoff | B64C 1/1492 | 244/129.3 |
| 9,897,254 B2 * | 2/2018 | Wilson | F16N 31/006 | |
| 2006/0123718 A1 * | 6/2006 | Paspirgilis | B64C 1/1492 | 52/204.1 |
| 2008/0078877 A1 * | 4/2008 | Switzer et al. | 244/129.3 | |
| 2008/0169381 A1 * | 7/2008 | Ostrem | B64C 1/1492 | 244/129.3 |
| 2009/0159739 A1 * | 6/2009 | Wilson | F16N 31/002 | 244/17.11 |
| 2009/0241424 A1 * | 10/2009 | Mohat | B64C 1/1484 | 49/349 |
| 2010/0046235 A1 * | 2/2010 | Burgunder | B64C 1/1492 | 362/311.02 |
| 2012/0097794 A1 * | 4/2012 | Fort | B64C 1/1492 | 244/129.4 |
| 2012/0119031 A1 * | 5/2012 | Ainsworth | B64C 1/1492 | 244/129.3 |
| 2012/0135180 A1 * | 5/2012 | Weber | B29C 70/24 | 428/71 |
| 2012/0325344 A1 * | 12/2012 | Chaumel | B64C 1/1492 | 137/557 |
| 2013/0168495 A1 * | 7/2013 | Mueller | B64C 1/1492 | 244/129.3 |
| 2013/0259562 A1 * | 10/2013 | Burd | B64D 11/04 | 403/187 |
| 2013/0320143 A1 * | 12/2013 | Chaumel | B64C 1/1484 | 244/129.3 |
| 2014/0117160 A1 * | 5/2014 | McCannnnon | B64C 1/066 | 244/129.3 |
| 2014/0131516 A1 * | 5/2014 | Boenning | B64C 1/1492 | 244/129.3 |
| 2014/0134389 A1 * | 5/2014 | Humfeldt | B64C 1/067 | 428/99 |
| 2014/0263819 A1 * | 9/2014 | Wilson | F16N 31/006 | 244/17.11 |
| 2015/0064389 A1 * | 3/2015 | Zahlen | B32B 37/16 | 428/76 |
| 2016/0137549 A1 * | 5/2016 | Meiss | C03C 17/007 | 428/141 |
| 2017/0217560 A1 * | 8/2017 | Gideon | B64C 1/1492 | |
| 2017/0334540 A1 * | 11/2017 | Hanske | B64C 1/1492 | |

\* cited by examiner

AIRCRAFT WINDOW ARRANGEMENT

CROSS-REFERENCES TO RELATED APPLICATIONS

This application claims the benefit of the U.S. Provisional Application No. 61/725,499, filed on Nov. 13, 2012, and of the European patent application No. 12 192 367.6 filed on Nov. 13, 2012, the entire disclosures of which are incorporated herein by way of reference.

BACKGROUND OF THE INVENTION

The invention relates to an aircraft window arrangement and a method of installing a window arrangement in an aircraft.

The cabin of modern passenger aircraft usually is equipped with sidewall lining panels which are attached to the aircraft structure, e.g., to ribs of the aircraft's primary structure, via suitable fastening devices. A typical aircraft sidewall lining panel comprises an inner facing which, when the sidewall lining panel is mounted in an aircraft, faces an interior of the aircraft cabin, and an outer facing which, when the sidewall lining panel is mounted in the aircraft, faces away from the interior of the aircraft cabin. In the region of a window opening provided in the sidewall lining panel, the outer facing of the sidewall lining panel is formed integral with a window funnel. The window funnel extends between an inner window and an outer window along a circumference of the window opening, wherein the circumferential dimension of the window funnel decreases in a direction from the inner window to the outer window. A retainer for retaining the outer window is formed separate from the window funnel.

Since a misalignment of straight lines is easily recognizable for the human eye, upon mounting the sidewall lining panel in the aircraft, the sidewall lining panel is oriented such that any straight edges of the panel which adjoin straight edges of adjoining interior components mounted in the aircraft cabin are aligned as accurate as possible so as to ensure a pleasant visual appearance of the aircraft cabin. However, a certain misalignment between the side wall lining panel and the retainer for retaining the outer window is tolerated so as to allow manufacturing and mounting tolerances to be compensated for. In the final assembly position of the sidewall lining panel and the retainer, the window funnel therefore typically is positioned relative to the retainer such that the window funnel decreases the visible surface of the outer window, i.e., a circumferential dimension of an outer rim of the window funnel facing the outer window is smaller than the circumferential dimension of the outer window. Further, in order to mask a possible misalignment between the window funnel and the outer window, the outer window, in a circumferential region, usually is provided with a dark colored tolerance masking which further reduces the visible window surface.

SUMMARY OF THE INVENTION

The invention is directed at the object of providing an aircraft window arrangement and a method of installing a window arrangement in an aircraft which allow a particularly pleasant visual appearance of the aircraft cabin to be achieved.

An aircraft window arrangement comprises a sidewall lining panel which is provided with a window opening. The window opening may have any desired shape, but preferably has an oval shape. An inner window is attached to the sidewall lining panel and extends across the window opening formed in the sidewall lining panel so as to close the window opening formed in the sidewall lining panel. The aircraft window arrangement further comprises an outer window which is arranged at a distance from the inner window and extends across a window opening formed in an aircraft outer skin. Preferably, the inner window and the outer window extend substantially parallel to each other. Finally, the aircraft window arrangement comprises a window funnel. The window funnel comprises an inner rim facing the inner window and extending along a circumference of the window opening formed in the sidewall lining panel, and an outer rim facing the outer window and extending along a circumference of the window opening formed in the aircraft outer skin.

The cross-sectional shape of the window funnel may be adapted to the shape of the window openings provided in the sidewall lining panel and the aircraft outer skin. For example, when the window openings provided in the sidewall lining panel and the aircraft outer skin are provided with an oval shape, the window funnel preferably has an oval cross-sectional shape. Further, the circumferential dimension of the window funnel may decrease in a direction from the inner window to the outer window. As a result, the circumferential dimension of the window funnel's inner rim facing the inner window may be larger than the circumferential dimension of the window funnel's outer rim facing the outer window. In the aircraft window arrangement, the window funnel is formed separate from the sidewall lining panel, i.e., the sidewall lining panel and the window funnel are provided in the form of separate components.

The design of the aircraft window arrangement allows the sidewall lining panel and the window funnel to be positioned and aligned in their final mounting position in an aircraft independently from each other. Specifically, the sidewall lining panel may be oriented such that any straight edges of the panel which adjoin straight edges of adjoining interior components mounted in the aircraft cabin are aligned as accurate as possible. Additionally thereto, the window funnel may be positioned and aligned as desired, for example such that the window funnel does not cover a region of the outer window which otherwise would be visible. Further, an accurate positioning of the window funnel relative to the outer window allows the need to provide a circumferential region of the outer window with a dark colored tolerance masking to be dispensed with. As a result, the visible surface of the outer window can be maximized.

A misalignment between the side wall lining panel and the window funnel, for example due to manufacturing and mounting tolerances, in the aircraft arrangement, becomes visible only along a curved line defined by adjacent edges of the sidewall lining panel and the window funnel. Due to the human eye being much less sensitive to misalignments along curved lines as compared to misalignments along straight lines, the visual appearance of the window arrangement, however, is not impaired by such a misalignment. The window arrangement thus allows a particularly pleasant visual appearance of the aircraft cabin to be achieved. Further, the window arrangement is easy to install due to fewer installation constraints.

The outer window may be retained in a retainer extending along a circumference of the outer window. The retainer may be formed integral with the aircraft outer skin or may be attached to the aircraft outer skin and/or the aircraft structure. For example, the retainer may comprise at least one retaining groove for retaining a circumferential region of the outer window. The outer window may comprise a first and a second window screen which may extend substantially parallel and at a distance from each other. In this case, the retainer preferably comprises a first retaining groove for retaining a circumferential region of the first window screen and a second retaining groove for retaining a circumferential region of the second window screen. The distance between the first and the second window screen may be defined by a central protrusion of the retainer separating the first and the second retaining groove. The window funnel may be attached to the retainer. As a result, a separate support structure for fixing the window funnel in its final mounting position can be omitted, saving costs and weight.

Preferably, the window funnel is attached to the retainer such that the outer rim of the window funnel is substantially aligned with an inner rim of the retainer. In other words, the window funnel and the retainer preferably are shaped and dimensioned and the window funnel preferably is positioned relative to the retainer such that the circumference of the outer rim of the window funnel corresponds to and is aligned with the circumference of the inner rim of the retainer. This arrangement ensures that the visible surface of the outer window thus is not affected by the window funnel. Instead, despite the window funnel being present, the size of the visible surface of the outer window is determined only by the design of the retainer, in particular by the depth of the retaining groove which retains the circumferential region of the outer window so as to retain the outer window in place.

The window funnel may be attached to the retainer by means of an attachment mechanism. The attachment mechanism may be adapted to releasably attach the window funnel to the retainer. For example, the attachment mechanism may be a click-and-snap mechanism which allows the window funnel to be attached to the retainer in a fast and easy manner. The attachment mechanism should, however, be capable of fixing the window funnel to the retainer in a load bearing manner such that the window funnel is securely held in its position during operation of the aircraft. In a preferred embodiment the attachment mechanism comprises a first attachment element provided on the window funnel and a second attachment element provided on the retainer. The attachment elements provided on the window funnel and the retainer, respectively, may be formed complementary to each other. The first attachment element may be provided in the region of the outer rim of the window funnel. The second attachment element may be provided in the region of an inner surface of the retainer which faces the inner window. For example, first attachment element may be adapted to interact with the second attachment element so as to form click-and-snap mechanism which allows the window funnel to be attached to the retainer.

Basically, the window funnel may be entirely decoupled from the sidewall lining panel, i.e., if desired, a connection between the window funnel and the sidewall lining panel may be omitted, provided that the window funnel is held in place by means of a suitable support mechanism, for example an attachment mechanism for attaching the window funnel to the retainer as described above. It is, however, also conceivable to equip the aircraft window arrangement with a fastening mechanism which is adapted to releasably attach the window funnel to the sidewall lining panel. It is not necessary for the fastening mechanism to be capable of fastening the window funnel to the sidewall lining panel in a load bearing manner, in case the window funnel is held in place by means of a suitable support mechanism, for example, an attachment mechanism as described above for attaching the window funnel to the retainer. In this case, the fastening mechanism may serve to simplify the positioning and the alignment of the window funnel relative to the other components of the aircraft window arrangement.

The fasting mechanism may comprise a first fastening element provided on the window funnel and a second fastening element provided on the sidewall lining panel. For example, the first fastening element may be disposed in the region of the inner rim of the window funnel. The second fastening element may be disposed in the region of a surface of an outer facing of the sidewall lining panel which faces an outer generated surface of the window funnel. For example, the fastening mechanism may be designed in the form of a hook-and-loop fastening mechanism, which comprises corresponding hook-and-loop tapes adhered to the window funnel and the sidewall lining panel, respectively, as the first and the second fastening elements. Further, the fastening mechanism may comprise a suitable sealing element for sealing the window funnel against at least one of the sidewall lining panel and the inner window. In addition, it is also conceivable to provide the fastening mechanism with a suitable dampening element made, for example, of an elastic material, in particular an elastic foam material, for dampening vibrations transmitted from the retainer and the outer window to the sidewall lining panel via the window funnel.

The sidewall lining panel may comprise a frame element extending along the circumference of the window opening formed in the sidewall lining panel. The circumferential shape of the frame element may be adapted to the shape of the inner window. For example, when the inner window is provided with an oval circumferential shape, the frame element preferably also has an oval circumferential shape. The frame element may be positioned so as to abut against a surface of the inner window which faces away from the outer window. Hence, the inner window may extend between the frame element and the window funnel. The inner window, in a circumferential region thereof, may be fastened to the frame element, for example, by a suitable adhesive.

A circumferential dimension of the frame element preferably is smaller than a circumferential dimension of the inner rim of the window funnel. When viewed from a position within an aircraft passenger cabin equipped with the aircraft window arrangement, the frame element then prevents a direct view of the inner rim of the window funnel and hence improves the visual appearance of the window arrangement. The frame element, however, covers a circumferential region of the inner window and thus decreased a visible surface of the inner window. To avoid an excessive limitation of the visible surface of the inner window, the circumferential dimension and the shape of the frame element should be selected so as to ensure that a direct view of the inner rim of the window funnel is prevented, while the visible surface of the inner window is maintained as large as possible. This may, for example, be achieved by providing the frame element with a wedge-shaped cross-section such that a circumferential dimension of an inner rim of the frame element which faces the inner window is smaller than a circumferential dimension of an outer rim of the frame element which faces away from the inner window. A connecting surface of the frame element extending between the outer rim and the inner rim may be inclined in a direction from the outer rim to the inner rim providing for a particularly pleasant visual appearance of the window arrangement.

In a method of installing a window arrangement in an aircraft, an aircraft outer skin with a window opening formed therein is provided. An outer window extends across a window opening formed in the aircraft outer skin. Further, a sidewall lining panel with a window opening formed therein is provided. An inner window extends across the window opening formed in the sidewall lining panel. A window funnel which is formed separate from the sidewall lining panel is positioned relative to the aircraft outer skin such that an outer rim of the window funnel faces the outer window and extends along a circumference of the window opening formed in the aircraft outer skin. The sidewall lining panel is positioned relative to the window funnel such that an inner rim of the window funnel faces the inner window and extends along a circumference of the window opening formed in the sidewall lining panel. In the method of installing a window arrangement in an aircraft, the sidewall lining panel and the window funnel are positioned and aligned independently of each other, thus allowing the sidewall lining panel to be positioned and aligned in a way that a pleasant visual appearance of an aircraft cabin equipped with the window arrangement is achieved while simultaneously, by appropriately positioning the window funnel, the visible surface of the outer window can be maximized.

The window funnel may be attached to a retainer retaining the outer window and extending along a circumference of the outer window.

The window funnel may be attached to the retainer such that the outer rim of the window funnel is substantially aligned with an inner rim of the retainer.

For example, the window funnel is attached to the retainer by means of an attachment mechanism which is adapted to releasably attach the window funnel to the retainer. The attachment mechanism may comprise a first attachment element provided on the window funnel in the region of the outer rim of the window funnel and a second attachment element provided on the retainer in the region of an inner surface of the retainer, the inner surface of the retainer facing the inner window.

The window funnel may be releasably attached to the sidewall lining panel by a fastening mechanism comprising a first fastening element provided on the window funnel in the region of the inner rim of the window funnel and a second fastening element provided on the sidewall lining panel in the region of a surface of an outer facing of the sidewall lining panel which faces an outer generated surface of the window funnel.

The sidewall lining panel may comprise a frame element extending along the circumference of the window opening formed in the sidewall lining panel, wherein a circumferential dimension of the frame element preferably is smaller than a circumferential dimension of the inner rim of the window funnel.

BRIEF DESCRIPTION OF THE DRAWINGS

A preferred embodiment of the invention now is described in more detail with reference to the appended schematic drawings, wherein.

DETAILED DESCRIPTION OF THE PREFERRED EMBODIMENTS

Figure 1:
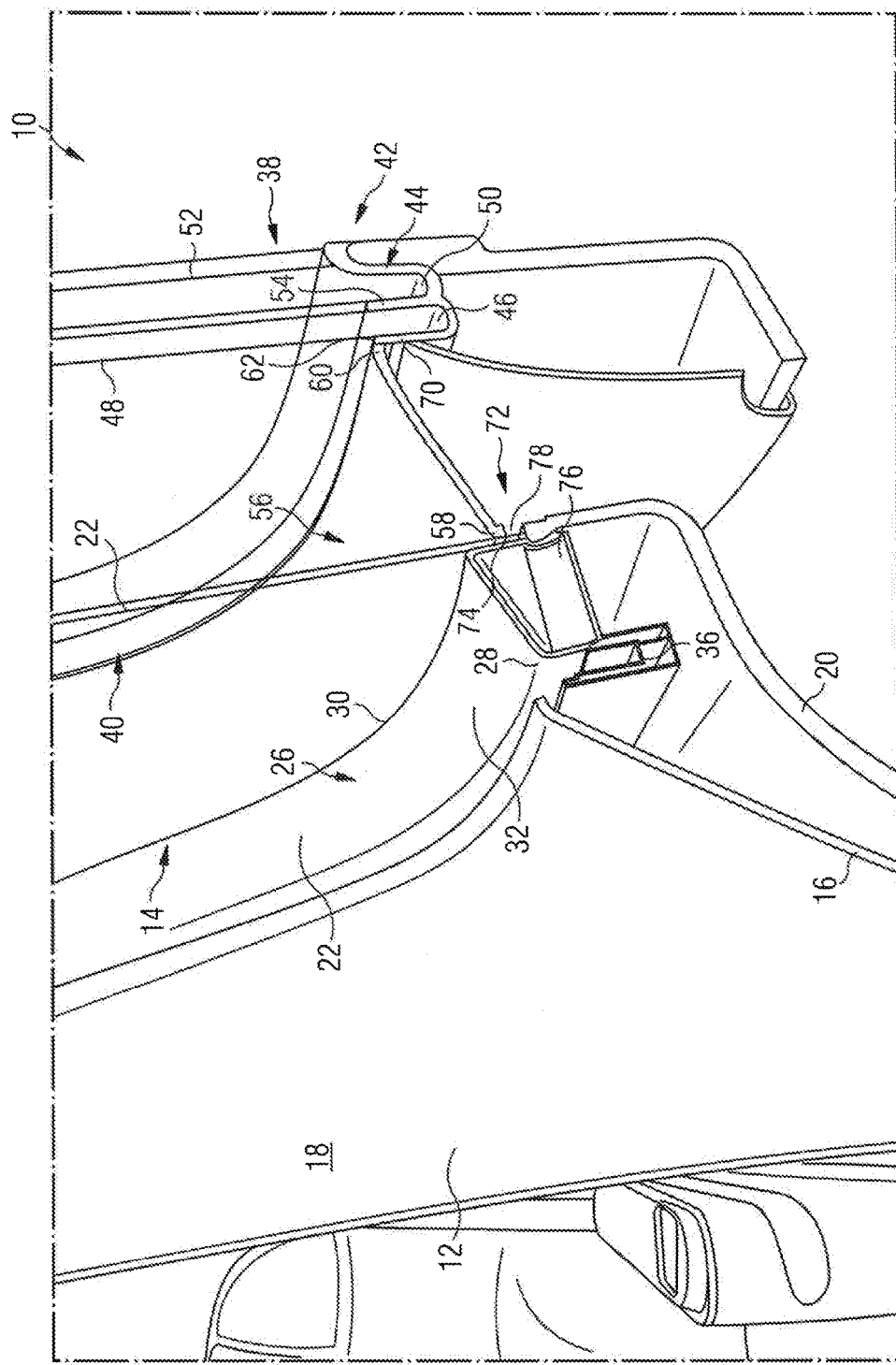
FIG. 1 shows a partial view of an aircraft window arrangement.

An aircraft window arrangement 10 depicted in FIG. 1 comprises a sidewall lining panel 12 which is provided with an oval window opening 14. The sidewall lining panel for example comprises a core having a honeycomb structure, an inner facing 16 which, when the sidewall lining panel 12 is mounted in an aircraft, faces an interior of an aircraft cabin 18, and an outer facing 20 which, when the sidewall lining panel 12 is mounted in the aircraft, faces away from the interior of the aircraft cabin 18. An oval inner window 22 is attached to the sidewall lining panel 12 and extends across the window opening 14 formed in the sidewall lining panel 12 so as to close the window opening 14.

The sidewall lining panel 12 further comprises a frame element 26 having an oval circumferential shape and extending along the circumference of the window opening 14 formed in the sidewall lining panel 12. The frame element 26 is attached to the outer facing 20 of the sidewall lining panel 12 and is positioned so as to abut against a surface of the inner window 22 which faces the interior of the aircraft cabin 18. If desired, the inner window 22, in a circumferential region thereof, may be fastened to the frame element 26, for example, by a suitable adhesive. The frame element 26 has a wedge-shaped cross-section, i.e., a circumferential dimension of an inner rim 28 of the frame element 26 which faces the inner window 22 is smaller than a circumferential dimension of an outer rim 30 of the frame element 26 which faces away from the inner window 22. A connecting surface 32 of the frame element 26 extending between the outer rim 30 and the inner rim 28 is inclined in a direction from the outer rim 30 to the inner rim 28.

Adjacent to the outer rim 30 of the frame element 28 in a direction facing away from the inner window 22, a guiding groove 36 is formed in the outer facing 20 of the sidewall lining panel 12. The guiding groove 36 serves to guide a displacement of a window blind (not shown in the drawing) between a closed position, wherein the window blind covers the inner window, and an open position, wherein the window blind does not cover the inner window.

The aircraft window arrangement 10 further comprises an oval outer window 38 which is arranged at a distance from the inner window 22 and extends across an oval window opening 40 formed in an aircraft outer skin 42. The outer window 38 extends substantially parallel to the inner window 22 and is retained in a retainer 44 extending along a circumference of the outer window 38. The retainer 44 is attached to the aircraft outer skin 42 and comprises a first retaining groove 46 for retaining a circumferential region of a first window screen 48 of the outer window 38 and a second retaining groove 50 for retaining a circumferential region of a second window screen 52 of the outer window 38. The first and the second window screen 48, 52 of the outer window 38 extend substantially parallel and at a distance from each other, wherein the distance between the first and the second window screen 48, 50 is defined by a central protrusion 54 of the retainer 44 which separates the first and the second retaining groove 46, 50.

Finally, the aircraft window arrangement 10 comprises a window funnel 56 which is formed as separate component, i.e., which is in particular formed separate from the sidewall lining panel 12. The window funnel 56 comprises an inner rim 58 facing the inner window 22 and extending along a circumference of the window opening 14 formed in the sidewall lining panel 12, and an outer rim 60 facing the outer window 38 and extending along a circumference of the window opening 40 formed in the aircraft outer skin 42. The cross-sectional shape of the window funnel 56 is adapted to the shape of the window openings 14, 40 provided in the sidewall lining panel 12 and the aircraft outer skin 42, i.e., the window funnel 56 has an oval cross-sectional shape. The circumferential dimension of the window funnel 56 decreases in a direction from the inner window 22 to the outer window 38. As a result, the circumferential dimension of the window funnel's inner rim 58 facing the inner window 22 is larger than the circumferential dimension of the window funnel's outer rim 60 facing the outer window 38.

The window funnel 56 is attached to the retainer 44 such that the outer rim 60 of the window funnel 56 is substantially aligned with an inner rim 62 of the retainer 44. Specifically, the window funnel 56 is positioned relative to the retainer 44 such that the circumference of the outer rim 60 of the window funnel 56 corresponds to and is aligned with the circumference of the inner rim 62 of the retainer 44. This arrangement ensures that a visible surface of the outer window 38, i.e., a surface of the outer window 38 which is visible when viewed from the interior of the passenger cabin 18, is not affected by the window funnel 56. Thus, despite the window funnel 56 being present, the size of the visible surface of the outer window 38 is determined only by the design of the retainer 44, in particular by the depth of the retaining grooves 46, 50 which retains the circumferential region of the window screens 48, 52 of the outer window 38.

Figure 2:
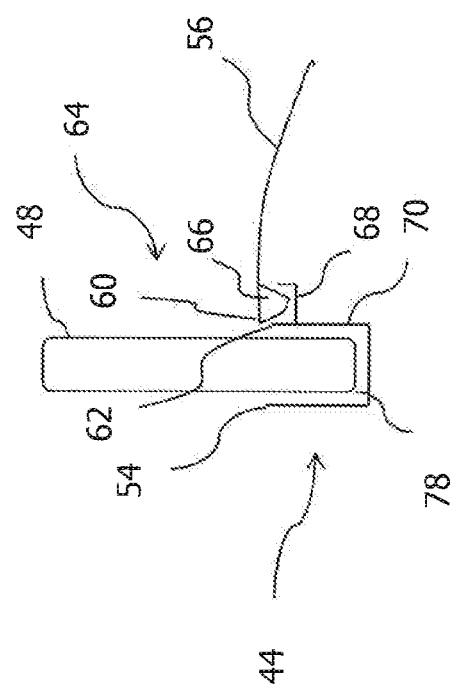
FIG. 2 shows a detailed view of an attachment mechanism employed in the aircraft window arrangement according to FIG. 1.

The window funnel 56 is attached to the retainer 44 by means of an attachment mechanism 64 depicted in FIG. 2. The attachment mechanism 64 is designed in the form of a click-and-snap mechanism and is adapted to releasably attach the window funnel 56 to the retainer 44 in a load bearing manner such that the window funnel 56 is securely held in its position during operation of the aircraft. The attachment mechanism 64 comprises a first attachment element 66 provided in the region of the outer rim 60 of the window funnel 56 and a second attachment element 68 provided on the retainer 44 in the region of an inner surface 70 of the retainer 44 which faces the inner window 22.

Finally, the aircraft window arrangement 10 comprises a fastening mechanism 72 which is adapted to releasably attach the window funnel 56 to the sidewall lining panel 12. It is not necessary for the fastening mechanism 72 to be capable of fastening the window funnel 56 to the sidewall lining panel 12 in a load bearing manner, since the window funnel 56 is held in place by means of the attachment mechanism 64 for attaching the window funnel 56 to the retainer 44. Instead, the fastening mechanism 72 serves to simplify the positioning and the alignment of the window funnel 56 relative to the other components of the aircraft window arrangement 10.

The fasting mechanism 72 comprises a first fastening element 74 provided in the region of the inner rim 58 of the window funnel 56 and a second fastening element 76 provided in the region of a surface 78 of the outer facing 20 of the sidewall lining panel 12 which faces an outer generated surface of the window funnel 56. The fastening mechanism 72 is designed in the form of a hook-and-loop fastening mechanism, which comprises corresponding hook-and-loop tapes adhered to the window funnel 56 and the sidewall lining panel 12, respectively, as the first and the second fastening elements 74, 76. Additionally or alternatively thereto, a suitable sealing element (not shown in the drawings) for sealing the window funnel 56 against at least one of the sidewall lining panel 12 and the inner window 22 may be present. Further, it is also conceivable to provide a suitable dampening element (not shown in the drawings) made, for example, of an elastic material, in particular an elastic foam material, for dampening vibrations transmitted from the retainer 44 and the outer window 38 to the sidewall lining panel 12 via the window funnel 56.

The design of the aircraft window arrangement 10 allows the sidewall lining panel 12 and the window funnel 56 to be positioned and aligned in their final mounting position in the aircraft independently from each other. Specifically, upon installation of the window arrangement 10 in the aircraft, the sidewall lining panel 12 is oriented such that any straight edges of the panel 12 which adjoin straight edges of adjoining interior components mounted in the aircraft cabin 18 are aligned as accurate as possible, thus allowing a pleasant visual appearance of the aircraft cabin 18 to be achieved. Additionally thereto, the window funnel 56 is positioned and aligned such that the window funnel 56 does not cover a circumferential region of the outer window 38, hence maximizing the visible surface of the outer window 38.

A misalignment between the side wall lining panel 12 and the window funnel 56, for example due to manufacturing or mounting tolerances, becomes visible only along a curved line defined by adjacent edges of the sidewall lining panel 12 and the window funnel 56 and hence is hardly recognizable for the human eye. Further, a circumferential dimension of the frame element 26 is smaller than a circumferential dimension of the inner rim 58 of the window funnel 56. When viewed from a position within the aircraft passenger cabin 18, the frame element 26 thus prevents a direct view of the inner rim 58 of the window funnel 56 and hence further improves the visual appearance of the window arrangement 10.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft window arrangement comprising:
   a sidewall lining panel which is provided with a window opening,
   an inner window attached to the sidewall lining panel and extending across the window opening formed in the sidewall lining panel,
   an outer window arranged at a distance from the inner window and extending across a window opening formed in an aircraft outer skin,
   a window funnel comprising
     an inner rim facing the inner window and extending along a circumference of the window opening formed in the sidewall lining panel, and
     an outer rim facing the outer window and extending along a circumference of the window opening formed in the aircraft outer skin,
   a retainer extending along a circumference of the outer window, and
   wherein the outer rim of the window funnel is inserted into an inner rim of the retainer, thereby providing an attachment mechanism between the window funnel and the retainer, wherein the outer window is retained in the retainer, wherein the attachment mechanism is configured to releasably attach the window funnel to the retainer, the attachment mechanism comprising a first attachment element provided on the window funnel in a region of the outer rim of the window funnel and a second attachment element provided on the retainer in a region of an inner surface of the retainer, the inner surface of the retainer facing the inner window, and wherein a circumferential dimension of the window funnel decreases in a direction of the outer window from the inner rim of the window funnel to the outer rim of the window funnel.

2. The aircraft window arrangement according to claim 1, wherein the window funnel is attached to the retainer such that the outer rim of the window funnel is substantially aligned with the inner rim of the retainer.

3. The aircraft window arrangement according to claim 1, further comprising a fastening mechanism which is configured to releasably attach the window funnel to the sidewall lining panel, the fasting mechanism comprising a first fastening element provided on the window funnel in the region of the inner rim of the window funnel and a second fastening element provided on the sidewall lining panel in the region of a surface of an outer facing of the sidewall lining panel which faces an outer generated surface of the window funnel.

4. The aircraft window arrangement according to claim 1, wherein the sidewall lining panel comprises a frame element extending along the circumference of the window opening formed in the sidewall lining panel, a circumferential dimension of the frame element being smaller than a circumferential dimension of the inner rim of the window funnel.

5. A method of installing a window arrangement in an aircraft comprising:
providing an aircraft outer skin with a window opening formed therein, wherein an outer window extends across the window opening formed in the aircraft outer skin,
providing a sidewall lining panel with a window opening formed therein, wherein an inner window extends across the window opening formed in the sidewall lining panel,
providing a retainer extending along a circumference of the outer window;
after providing the aircraft outer skin and the retainer, installing a window funnel relative to the aircraft outer skin such that an outer rim of the window funnel inserts into an inner rim of the retainer by means of an attachment mechanism, the outer rim of the window funnel extending along a circumference of the window opening formed in the aircraft outer skin, and
positioning and aligning the sidewall lining panel independent of the window funnel such that an inner rim of the window funnel faces the inner window and extends along a circumference of the window opening formed in the sidewall lining panel, wherein the attachment mechanism is configured to releasably attach the window funnel to the retainer, the attachment mechanism comprising a first attachment element provided on the window funnel in a region of the outer rim of the window funnel and a second attachment element provided on the retainer in a region of an inner surface of the retainer, the inner surface of the retainer facing the inner window pane, and wherein a circumferential dimension of the window funnel decreases in a direction of the outer window from the inner rim of the window funnel to the outer rim of the window funnel.

6. The method according to claim 5, including the step of attaching the window funnel to the retainer such that the outer rim of the window funnel is substantially aligned with an inner rim of the retainer.

7. The method according to claim 5, further comprising:
providing a fastening mechanism for releasably attaching the window funnel to the sidewall lining panel, said fastening mechanism comprising a first fastening element provided on the window funnel in the region of the inner rim of the window funnel and a second fastening element provided on the sidewall lining panel in the region of a surface of an outer facing of the sidewall lining panel which faces an outer generated surface of the window funnel.

8. The method according to claim 5, further comprising:
providing a frame element extending along the circumference of the window opening formed in the sidewall lining panel, a circumferential dimension of the frame element being smaller than a circumferential dimension of the inner rim of the window funnel.

\* \* \* \* \*